United States Patent
Sato

(10) Patent No.: US 11,836,399 B2
(45) Date of Patent: Dec. 5, 2023

(54) INFORMATION PROCESSING APPARATUS WITH WHICH DETERIORATION OF COLORIMETRIC ACCURACY IS SUPPRESSED, IMAGE FORMING SYSTEM INCLUDING THE INFORMATION PROCESSING APPARATUS, AND COMPUTER READABLE STORAGE MEDIUM

(71) Applicant: CANON KABUSHIKI KAISHA, Tokyo (JP)

(72) Inventor: Hiroki Sato, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/714,605

(22) Filed: Apr. 6, 2022

(65) Prior Publication Data

US 2022/0326892 A1    Oct. 13, 2022

(30) Foreign Application Priority Data

Apr. 12, 2021 (JP) ................. 2021-067244

(51) Int. Cl.
  *G06F 3/12*   (2006.01)
  *H04N 1/00*   (2006.01)
  *G01J 3/46*   (2006.01)

(52) U.S. Cl.
  CPC .......... *G06F 3/1208* (2013.01); *G06F 3/1256* (2013.01); *H04N 1/00023* (2013.01); *H04N 1/00034* (2013.01); *H04N 1/00074* (2013.01); *H04N 1/00482* (2013.01); *G01J 2003/467* (2013.01)

(58) Field of Classification Search
  None
  See application file for complete search history.

(56) References Cited

U.S. PATENT DOCUMENTS

| | | | |
|---|---|---|---|
| 2009/0103121 A1* | 4/2009 | Horita | H04N 1/6011 358/1.9 |
| 2019/0146735 A1 | 5/2019 | Tsukano | G06F 3/1254 |

FOREIGN PATENT DOCUMENTS

JP    2019-092050    6/2019

OTHER PUBLICATIONS

Application 17/713031 filed Apr. 4, 2022.

* cited by examiner

*Primary Examiner* — Andrew H Lam
(74) *Attorney, Agent, or Firm* — Venable LLP

(57) ABSTRACT

An information processing apparatus includes: a selection unit configured to select, based on a selection criterion, one or more first colorimetric regions in an image to be formed based on image data; an input/output control unit configured to receive a first user input for selecting one or more second colorimetric regions from the one or more first colorimetric regions selected by the selection unit; and a transmission unit configured to transmit a print job including information indicating the one or more second colorimetric regions and the image data, to an image forming apparatus.

13 Claims, 11 Drawing Sheets

INFORMATION PROCESSING APPARATUS WITH WHICH DETERIORATION OF COLORIMETRIC ACCURACY IS SUPPRESSED, IMAGE FORMING SYSTEM INCLUDING THE INFORMATION PROCESSING APPARATUS, AND COMPUTER READABLE STORAGE MEDIUM

BACKGROUND OF THE INVENTION

Field of the Invention

The present invention relates to an information processing apparatus with which deterioration of colorimetric accuracy is suppressed, an image forming system including the information processing apparatus, and a computer readable storage medium.

Description of the Related Art

With an image forming apparatus that forms an image using an electrophotographic process, an output image may have density, tint, and the like changing due to a change over time or a change in the ambient condition. In view of this, the image forming apparatus performs image stabilization control. For example, in density stabilization control, the image forming apparatus forms a test image on a photoconductor, an intermediate transfer belt, and the like, and detects the density of the test image using an optical sensor or the like. Then, the image forming apparatus sets an image forming condition to achieve an appropriate density of the output image, based on the result of detecting the density of the test image. With the result of detection on the test image formed on the photoconductor, the intermediate transfer belt, and the like, the quality of an image finally formed on a recording material cannot be determined. In view of this, an image forming condition is further set based on the result of the detection on the test image formed on the recording material.

US-2019-146735 discloses a configuration for a user to visually check an image formed on a recording material, and designate and adjust a color to be corrected.

A sensor for measuring a color value of an image formed on the recording material irradiates the recording material with light and detects a color in a colorimetric region based on the resultant reflected light. In principle, this process may involve a phenomenon, known as "reflection", resulting in a color of the detected colorimetric region being blurred due to reflected light from a portion in the vicinity of the colorimetric region. When the reflection occurs, the colorimetric accuracy deteriorates, and an appropriate image forming condition may fail to be set.

SUMMARY OF THE INVENTION

According an aspect of the present disclosure, an information processing apparatus includes: a selection unit configured to select, based on a selection criterion, one or more first colorimetric regions in an image to be formed based on image data; an input/output control unit configured to receive a first user input for selecting one or more second colorimetric regions from the one or more first colorimetric regions selected by the selection unit; and a transmission unit configured to transmit a print job including information indicating the one or more second colorimetric regions and the image data, to an image forming apparatus.

Further features of the present invention will become apparent from the following description of exemplary embodiments with reference to the attached drawings.

DESCRIPTION OF THE EMBODIMENTS

Figure 1:
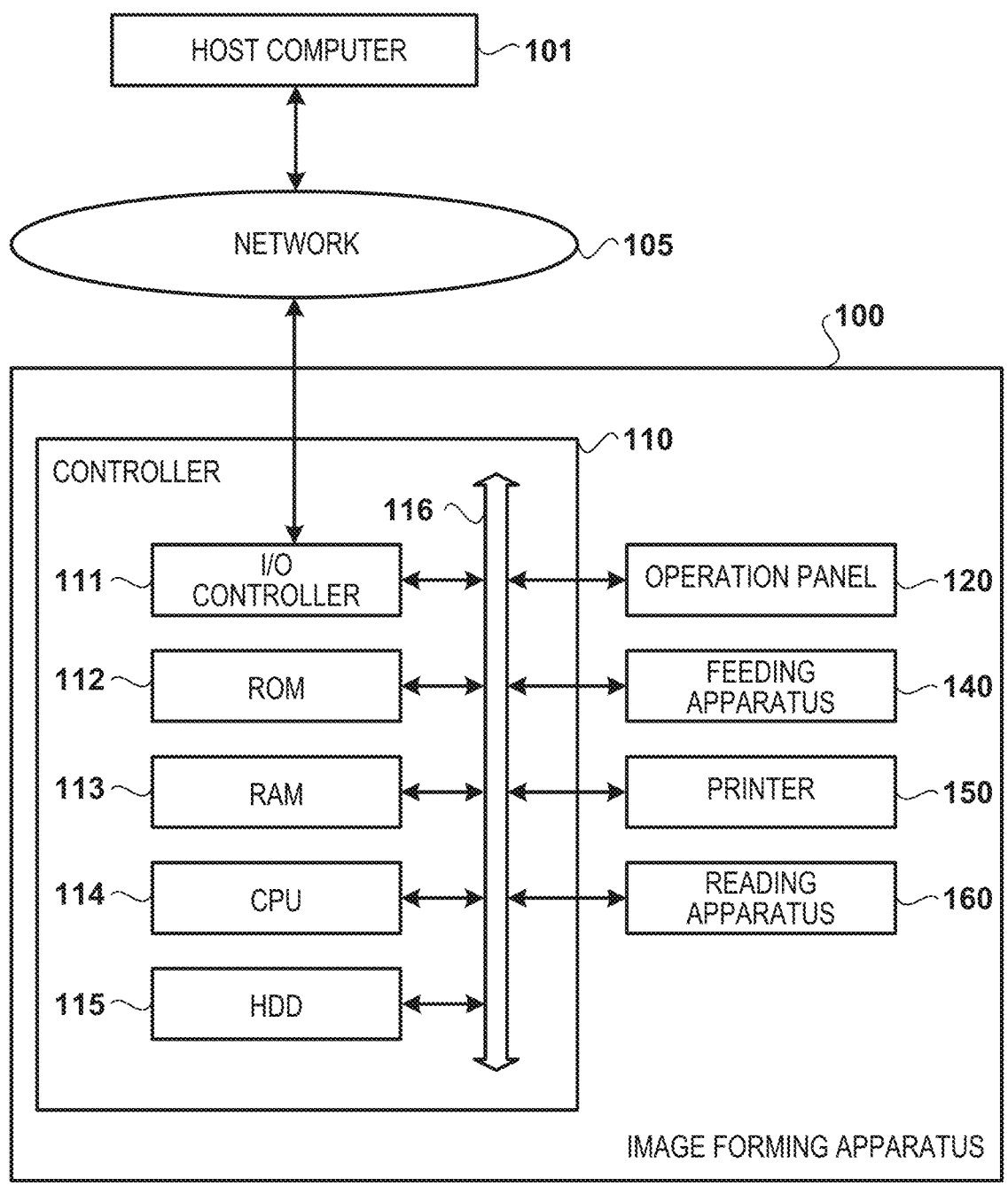
FIG. 1 is a configuration diagram of an image forming system according to an embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

FIG. 1 is a configuration diagram of an image forming system including an image forming apparatus 100. The image forming system includes the image forming apparatus 100 and a host computer 101. The image forming apparatus 100 and the host computer 101 can communicate with each other over a network 105. The network 105 is, for example, a LAN or WAN. In FIG. 1, one image forming apparatus 100 and one host computer 101 are connected to the network 105, but a plurality of the image forming apparatuses 100 and a plurality of the host computers 101 can be connected to the network 105.

The host computer 101, which is an information processing apparatus, transmits a print job to the image forming apparatus 100 over the network 105. The print job includes various types of information required for printing, such as image data of an image to be formed, the type of sheet on which printing (image forming) is to be performed, the number of printed sheets, and whether double-sided printing or one-sided printing is performed.

The image forming apparatus 100 forms an image on the sheet based on the print job received from the host computer 101. The sheet is a target of image forming by the image forming apparatus 100, such as printing paper or an OHP sheet, and can be made of any material. The image forming apparatus 100 includes a controller 110, an operation panel 120, a feeding apparatus 140, a printer 150, and a reading apparatus 160, which can communicate with each other via a system bus 116.

A ROM 112 that is a nonvolatile memory of the controller 110 stores various types of control programs. A RAM 113 is a volatile memory, and functions as a system work memory for reading and storing a control program stored in the ROM 112. A CPU 114 executes the control program read on the RAM 113 to collectively control the entire image forming apparatus 100. An HDD 115 is a large-capacity storage apparatus. The HDD 115 stores various types of data such as control programs and image data used for image forming processing (print processing). An I/O controller 111 is an interface for communicating with the host computer 101 and the like over the network 105. These functional blocks in the controller 110 can communicate with each other via the system bus 116.

Figure 2:
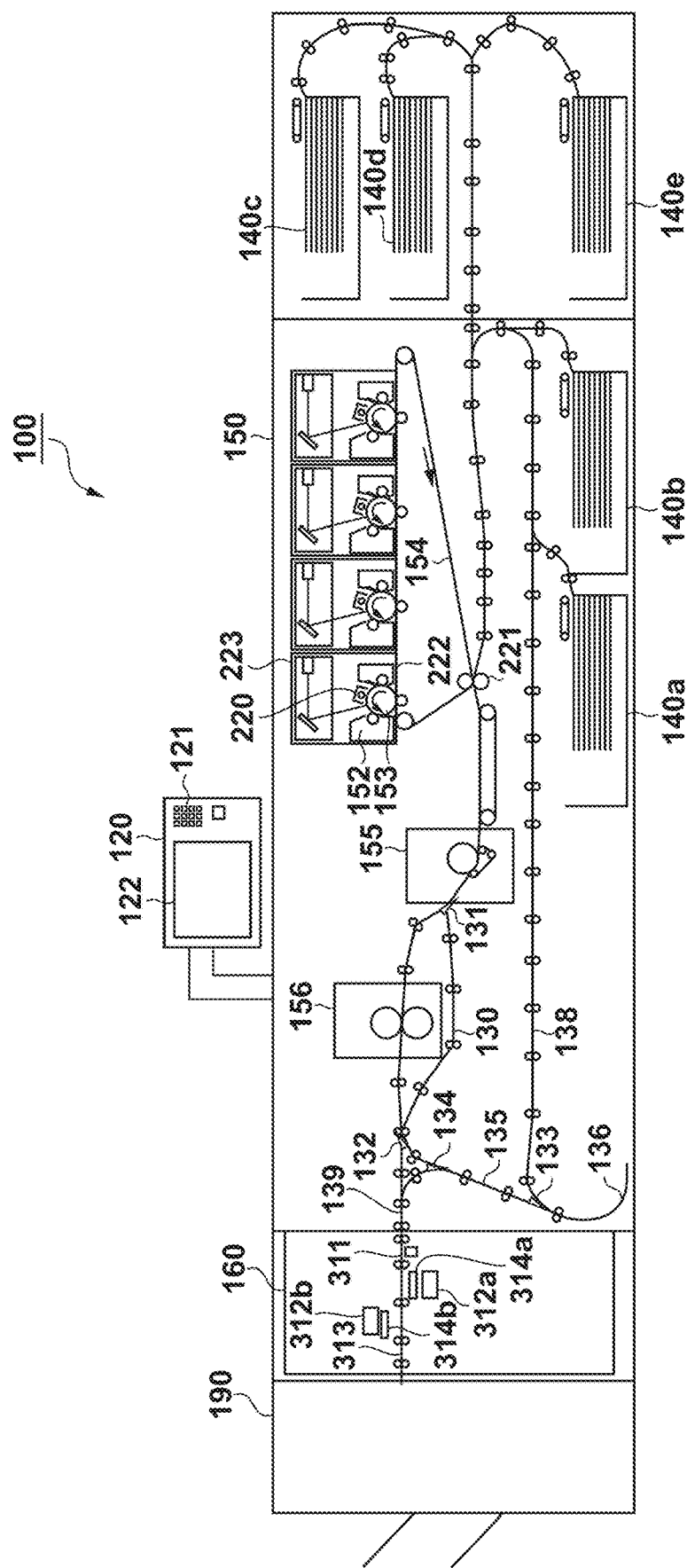
FIG. 2 is a configuration diagram of an image forming apparatus according to an embodiment.

The operation panel 120 provides a user interface. As illustrated in FIG. 2, the operation panel 120 includes operation buttons 121 and a display unit 122. The operation buttons 121 are an input interface for a user to operate the image forming apparatus 100. The display unit 122 is an output interface that displays a status of the image forming apparatus to the user.

Referring back to FIG. 1, the feeding apparatus 140 includes a plurality of feeding units containing sheets, and feeds the sheets in the feeding units to the printer 150. The printer 150 forms an image on the sheet fed from the feeding apparatus 140, based on image data from the host computer 101. A configuration of the printer 150 will be described below in detail with reference to FIG. 2. The reading apparatus 160 reads a surface of a sheet, and outputs the result of the reading to the controller 110.

FIG. 2 is a configuration diagram of the image forming apparatus 100. The image forming apparatus 100 includes the feeding apparatus 140, the printer 150, the reading apparatus 160, and a finisher 190.

The printer 150 includes four image forming units 222 that form yellow, magenta, cyan and black images. The image forming units 222 basically have a common configuration. A photoconductor 153 of the image forming unit is rotationally driven in a counterclockwise direction in the drawing during an image forming process. A charger 220 charges the surface of the photoconductor 153. An exposing apparatus 223 forms an electrostatic latent image on the photoconductor 153 by exposing the photoconductor 153 based on image data. A developing unit 152 develops the electrostatic latent image on the photoconductor 153 using a developing agent (toner). As a result, the electrostatic latent image on the photoconductor 153 is developed, whereby an image is formed on the photoconductor 153.

An intermediate transfer belt 154 is rotationally driven in a clockwise direction in the drawing during an image forming process. The image formed by each of the image forming units 222 is transferred to the intermediate transfer belt 154. Here, it is possible to form a full-color image on the intermediate transfer belt 154 by transferring the images formed by the image forming units 222 to the intermediate transfer belt 154 in an overlapping manner. The images transferred onto the intermediate transfer belt 154 are conveyed to an opposing position of transfer rollers 221.

The feeding apparatus 140 includes feeding units 140a, 140b, 140c, 140d, and 140e containing sheets. The feeding apparatus 140 feeds a sheet in any feeding unit to the printer 150. The printer 150 conveys the fed sheet toward the opposing position of the transfer rollers 221. The transfer rollers 221 transfer the images on the intermediate transfer belt 154 to the sheet.

The printer 150 includes a first fixing unit 155 and a second fixing unit 156 that heat and pressurize the images transferred to the sheet to fix the images to the sheet. The first fixing unit 155 includes fixing rollers including a heater therein, and a pressure belt for pressing the sheet to the fixing rollers. The rollers are driven by a motor (not illustrated) to convey the sheet. The second fixing unit 156 is disposed downstream from the first fixing unit 155 in the conveyance direction of the sheet. The second fixing unit 156 is provided to increase the gloss of the images on the sheet passing through the first fixing unit 155 and to ensure fixability. The second fixing unit 156 includes a fixing roller including a heater therein, and a pressure roller including a heater therein. The second fixing unit 156 is not required depending on the type of sheet. In this case, the sheet is conveyed to a conveyance path 130 and does not pass through the second fixing unit 156. A flapper 131 switches whether it guides the sheet to the conveyance path 130 or guides the sheet to the second fixing unit 156.

A flapper 132 switches whether it guides the sheet to a conveyance path 135 or guides the sheet to a discharge path 139. The flapper 132 guides, for example, a sheet having an image formed on a first surface in a double-sided printing mode to the conveyance path 135. The flapper 132 also guides, for example, a sheet having an image formed on the first surface in a face-up discharge mode to the discharge path 139. Furthermore, the flapper 132 guides, for example, a sheet having an image formed on the first surface in a face-down discharge mode to the conveyance path 135.

The sheet conveyed to the conveyance path 135 is conveyed to a reversing unit 136. After being conveyed to the reversing unit 136, the sheet conveyance direction is reversed. A flapper 133 switches whether it guides the sheet in the reversing unit 136 to a conveyance path 138 or guides the sheet to the conveyance path 135. The flapper 133 guides, for example, the sheet to the conveyance path 138 in the double-sided printing mode. Furthermore, the flapper 133 guides, for example, a sheet having been switched back in the face-down discharge mode to the conveyance path 135. The sheet conveyed by the flapper 133 to the conveyance path 135 is guided by a flapper 134 to the discharge path 139. The sheet conveyed to the conveyance path 138 by the flapper 133 is again conveyed to the opposing position of the transfer rollers 221, whereby an image is formed on both sides of the sheet.

The sheet guided to the discharge path 139 is conveyed along a conveyance path 313 of the reading apparatus 160. An original detection sensor 311 of the reading apparatus 160 detects a sheet conveyed along the conveyance path 313. The original detection sensor 311 is, for example, an optical sensor including a light-emitting element and a light-receiving element. A line sensor unit 312a reads one side of the sheet through an original reading glass 314a. A line sensor unit 312b reads the other side of the sheet through an original reading glass 314b. Note that the controller 110 controls the reading timing of the line sensor units 312a and 312b based on a detection timing of the sheet leading end by the original detection sensor 311.

The sheet that has passed through the reading apparatus 160 is discharged to the outside of the image forming apparatus 100 through the finisher 190. The finisher 190 is a post-processing apparatus that performs post-processing on a print product from the printer 150. The finisher 190 can perform staple processing and sort processing on a plurality of sheets on which an image has been formed, based on the print job.

Figure 3:
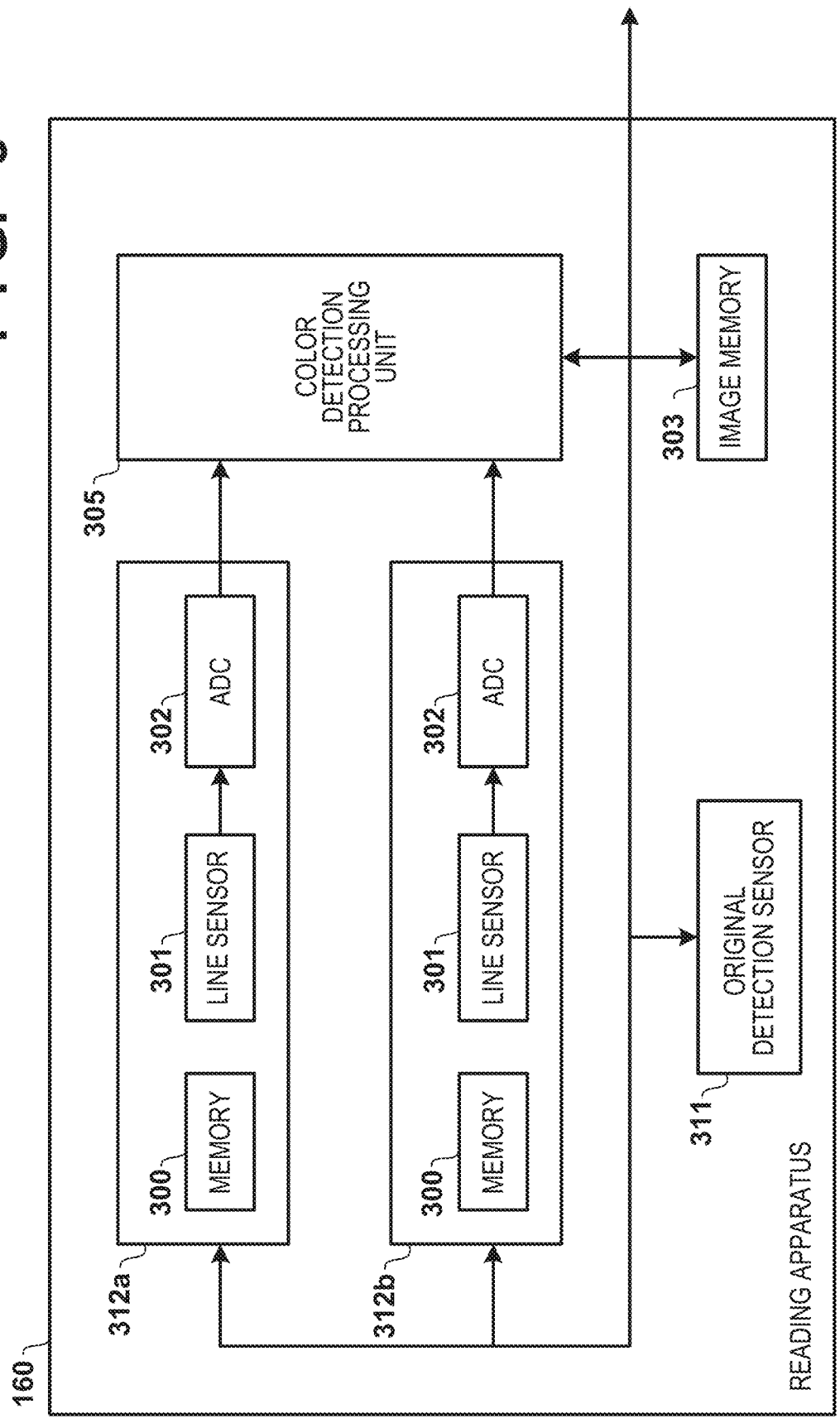
FIG. 3 is a configuration diagram of a reading apparatus according to an embodiment.
Figure 4:
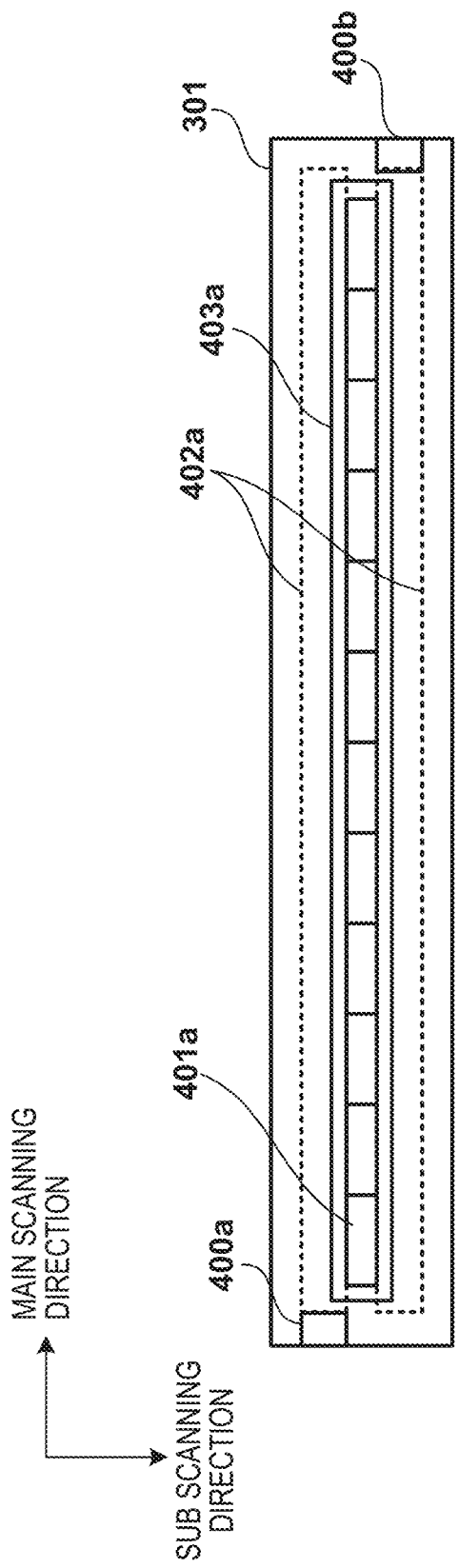
FIG. 4 is a configuration diagram of a line sensor unit according to an embodiment.

FIG. 3 is a functional block diagram of the reading apparatus 160. The line sensor units 312a and 312b have the same configuration, and each include a memory 300, a line sensor 301, and an analog-to-digital converter (ADC) 302. The line sensor 301 is, for example, a contact image sensor (CIS). FIG. 4 is a configuration diagram of the line sensor 301. LEDs 400a and 400b are light sources and emit white light. The LEDs 400a and 400b are respectively disposed at different end portions of light guides 402a, in the longitudinal direction. Note that the line sensor 301 is disposed to have the longitudinal direction being orthogonal to the conveyance direction of the sheet. Hereinafter, the longitudinal direction is also referred to as a main scanning direction, and the conveyance direction of the sheet is also referred to as a sub scanning direction. The light emitted by the LEDs 400a and 400b is diffused, in the main scanning direction, in the light guides 402a, and is emitted onto the sheet from the entirety of the light guides 402a in the main scanning direction. The reflected light from the sheet is incident on a plurality of light-receiving elements 401a, arranged along the main scanning direction, through a lens array 403a. Note that a reflection position, of the reflected light to be incident on each of the light-receiving elements 401a, in the sheet is also referred to as a pixel. The plurality of light-receiving elements 401a have a three-line configuration applied with red (R), green (G), and blue (B) color filters. The line sensor 301 according to the present embodiment is of a "double-sided illumination configuration", with which light is emitted from both sides of the lens array 403a in the sub scanning direction.

Referring back to FIG. 3, the memory 300 stores correction information for correcting variation in light quantity and the like among the plurality of light-receiving elements 401a of the corresponding line sensor 301. The line sensor 301 corrects the received light quantity of each of the light-receiving elements 401a using the correction information, and outputs an analog signal, indicating the received light quantity of each of the light-receiving elements 401a after the correction, sequentially to the ADC 302 as the received light quantity of the pixel. The ADC 302 converts the analog signal output from the corresponding line sensor 301, into a digital signal, and outputs the signal to a color detection processing unit 305 as read data. The read data indicates a luminance value of red (R), green (G), and blue (B) of each pixel. While the sheet is being conveyed, the line sensor 301 repeatedly reads an image corresponding to a single line in the main scanning direction, to read an image over the entirety of the sheet.

The color detection processing unit 305 outputs detected color information, which is color information on a colorimetric region in the RGB read data on the entire sheet, to the CPU 114. Note that the colorimetric region is notified from the CPU 114 as described below. The color detection processing unit 305 is configured by using an FPGA, an ASIC, a combination of these, or the like. An image memory 303 is used to temporarily store the read data in processing in the color detection processing unit 305. Thus, the reading apparatus 160 also serves as a colorimetric apparatus that measures a color value of the colorimetric region of the sheet.

In the present embodiment, the user operates the host computer 101 to set a color that is a target of image stabilization control (hereinafter, referred to as target color), and set a colorimetric region of the target color on the sheet. The host computer 101 transmits a print job, including colorimetric region information indicating the colorimetric region, to the controller 110 of the image forming apparatus 100. The CPU 114 notifies the reading apparatus 160 of the colorimetric region, and the reading apparatus 160 outputs the detected color information on the colorimetric region to the CPU 114. The CPU 114 performs the image stabilization control of the target color by comparing the detected color information, which is the result of measuring the color value of the colorimetric region, and a data value (color information) on the colorimetric region indicated by the image data included in the print job. More specifically, the CPU 114 sets/adjusts an image forming condition, to make the target color of the image formed by the image forming apparatus 100, close to the color indicated by the image data.

Figure 5:
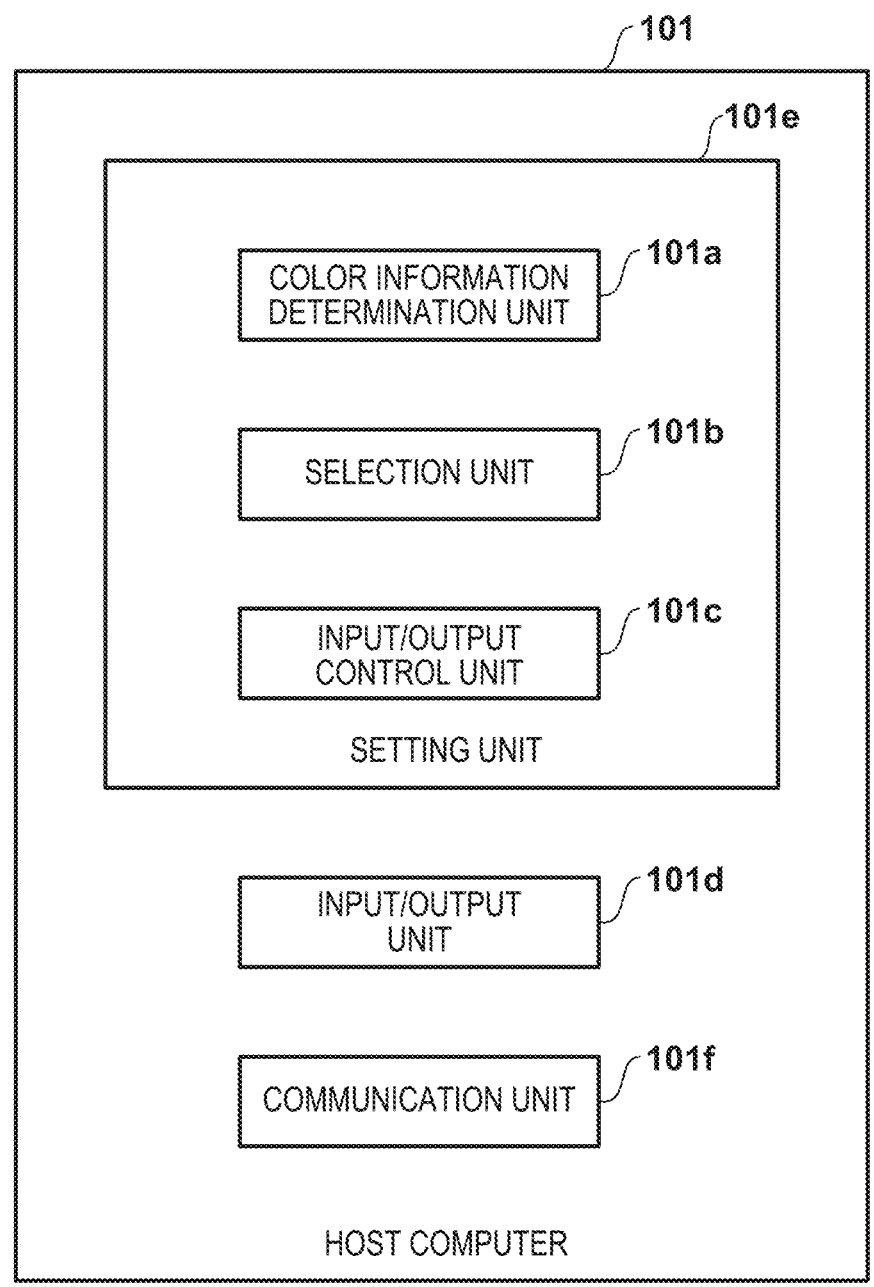
FIG. 5 is a block diagram of a host computer according to an embodiment.

The host computer 101 will be described below. FIG. 5 is a functional block diagram of the host computer 101. A communication unit 101f performs communication processing over the network 105. An input/output unit 101d includes, for example, an input device such as a mouse and a keyboard, and an output device such as a display. Note that when the host computer 101 is not a personal computer and is, for example, a tablet, the input/output unit 101d may be a touch panel display. A setting unit 101e includes a color information determination unit 101a, a selection unit 101b, and an input/output control unit 101c. The setting unit 101e is a functional block that may be realized with one or more processors (not illustrated) of the host computer 101 executing an appropriate program. Note that the program is stored in a memory device (not illustrated) of the host computer 101.

Figure 6:
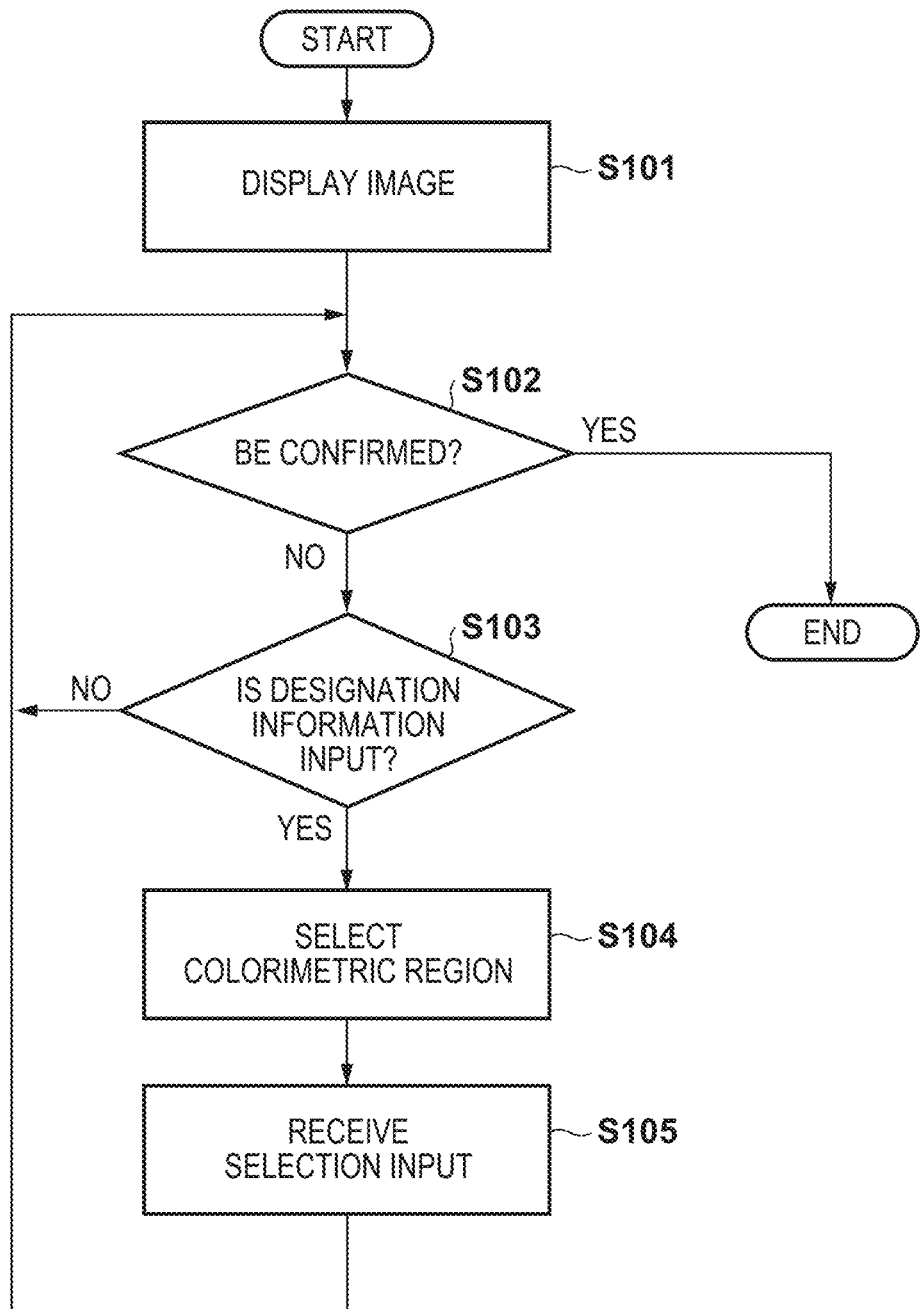
FIG. 6 is a flowchart of colorimetric region setting processing according to an embodiment.
Figure 7:
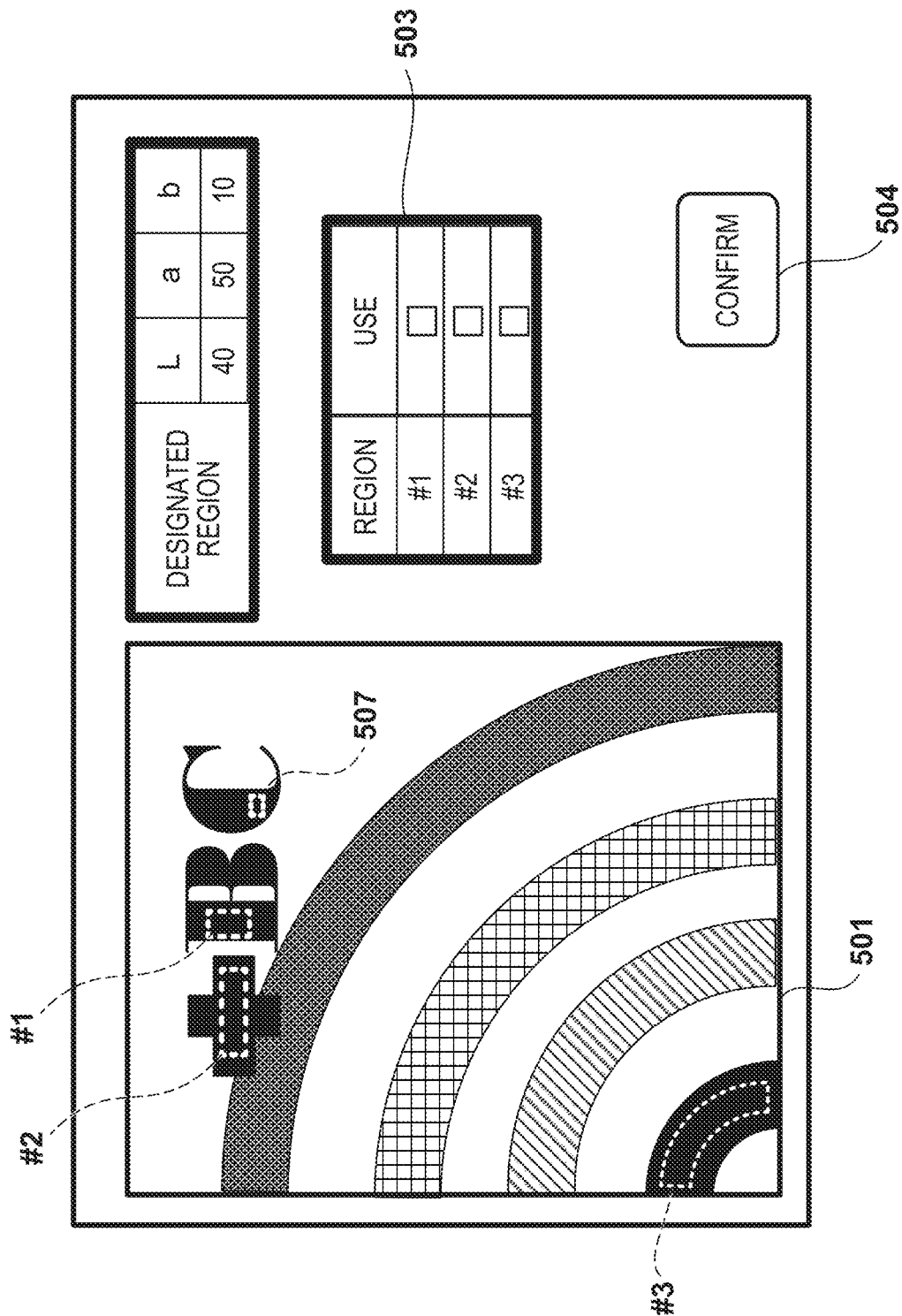
FIG. 7 is a diagram illustrating an example of a screen displayed to a user in colorimetric region setting processing.

FIG. 6 is a flowchart of colorimetric region setting processing. The processing in FIG. 6 is executed when the user transmits a print job to the image forming apparatus 100, for performing the stabilization control. In S101, the input/output control unit 101c displays an image formed based on the image data included in the print job, on a display of the input/output unit 101d. FIG. 7 is an example of a screen displayed on the display of the input/output unit 101d. As illustrated in FIG. 7, an image 501 formed based on the image data is displayed on the display.

In S102, the input/output control unit 101c determines whether a confirm button 504 in FIG. 7 is clicked with a mouse. When the confirm button 504 is not clicked with the mouse, the input/output control unit 101c receives an input (user input) of designation information designating the target color in S103. In the present example, the user inputs the designation information by designating a region to be of the target color in the image 501 displayed on the display, through a mouse operation. FIG. 7 illustrates a state where the user has designated a region 507. When the designation information is input, the color information determination unit 101a determines the color value of the region 507 based on image data. The input/output control unit 101c displays the color value determined by the color information determination unit 101a, in an area 502 in FIG. 7, as the color value of the target color. The region 507 designated by the user is displayed, by the input/output control unit 101c, in an overlapping manner on the image 501. Note that while color values of the target color in the Lab space are displayed in FIG. 7, a configuration may be employed in which color values in other color spaces such as the RGB space is displayed.

When the color value differs among a plurality of pixels in the region 507 designated by the user, the color information determination unit 101a may be configured to count the number of pixels in the region 507 corresponding to each color value, and determine the color value corresponding to the largest number of pixels to be the target color. The color information determination unit 101*a* may also be configured to determine as the target color, a color value having a ratio of the number of corresponding pixels in the region 507 exceeding a threshold. The input/output control unit 101*c* may be configured to display on the display, a message prompting the user to re-input the designation information, and cancel the designation information that has been input recently, when the color information determination unit 101*a* fails to determine the target color, due to a reason such as an absence of the color value having the ratio exceeding the threshold. Although not illustrated in FIG. 7, a configuration may be employed in which the color itself, determined to be the target color by the color information determination unit 101*a*, is also displayed in the area 502.

When the designation information is input, the selection unit 101*b* selects the colorimetric region of the target color from the image 501 based on a selection criterion in S104. The input/output control unit 101*c* displays, as a candidate of the colorimetric region, the colorimetric region selected by the selection unit 101*b*, in an area 503 in FIG. 7. It is illustrated in the area 503 in FIG. 7 that the selection unit 101*b* has selected three colorimetric regions #1, #2, and #3. The colorimetric region selected by the selection unit 101*b* is displayed, by the input/output control unit 101*c*, in an overlapping manner on the image 501. The input/output control unit 101*c* may be configured to display the region 507 designated by the user and the colorimetric region selected by the selection unit 101*b* on the image 501, while enabling the user to distinguish between the regions. This may be done, for example, by coloring a frame line indicating the region 507 and a frame line indicating the colorimetric region differently. Note that a configuration may be employed in which when the region 507 designated by the user can also be the colorimetric region, a frame line of yet another color is used for displaying such a region, to indicate that the region is designated by the user and is the colorimetric region.

The selection criterion is a criterion for the selection unit 101*b* to select the colorimetric region in the image 501. This selection criterion is determined and stored in a memory device (not illustrated) of the host computer 101 in advance. The selection criterion includes a condition related to the color value. The condition related to the color value is a condition with which a region in which the variation of color value is equal to or smaller than a predetermined value is selected as the selected region. For example, a maximum tolerable color difference $\Delta E$ is determined and stored in advance in the memory device (not illustrated) of the host computer 101. Then, the selection unit 101*b* selects, as the selected region, a region only including pixels with color values having a color difference from the color value of the target color equal to or smaller than $\Delta E/2$. Under such a condition regarding the color value, the maximum value of the color difference between any two pixels in the selected region would be equal to or smaller than the maximum tolerable color difference $\Delta E$. Note that the maximum tolerable color difference $\Delta E$ may be 0.

The selection criterion further includes a condition related to the number of sequential pixels. The condition related to the number of sequential pixels is a condition for selecting, as the colorimetric region, a region that is less likely to be affected by the reflection. For example, the condition related to the number of sequential pixels may include a first condition with which the colorimetric region is selected from regions, of regions satisfying the condition related to the color value, in which the number of sequential pixels in the main scanning direction is larger than a first predetermined number. The first predetermined number can be, in distance, 8 mm, for example. The condition related to the number of sequential pixels may further include a second condition with which the colorimetric region is selected from regions in which the number of sequential pixel arrays, satisfying the first condition, in the sub scanning direction is larger than a second predetermined number. Note that the positions/ranges, in the main scanning direction, of two pixel arrays satisfying the first condition adjacent to each other in the sub scanning direction do not need to be the same. It suffices if the ranges of the two pixel arrays in the main scanning direction include sections with a predetermined number of pixels overlapping. The condition related to the number of sequential pixels may further include a third condition with which the colorimetric region is selected from regions obtained by excluding a third predetermined number of pixels from an edge in the regions of pixels satisfying the second condition. Note that the third predetermined number is smaller than the first predetermined number and the second predetermined number. Note that in the present embodiment, the range of the color values of the pixels in the colorimetric region selected by the selection unit 101*b* is equal to or smaller than the maximum tolerable color difference $\Delta E$, and includes the color value of the target color.

While the colorimetric region can have any size and shape as long as the selection criterion is satisfied, for example, a configuration may be employed in which the largest one of the regions, under the condition of satisfying the selection criterion, is selected as the colorimetric region. Note that when there are a plurality of regions satisfying the selection criterion, the selection unit 101*b* may be configured to select some of the regions satisfying the selection criterion as the colorimetric regions, instead of selecting all of such regions. For example, the selection unit 101*b* can select a predetermined number of regions with large area, from the plurality of regions satisfying the selection criterion, as the colorimetric regions.

When the selection unit 101*b* selects the colorimetric region, in S105, the input/output control unit 101*c* receives the selection input (user input) indicating whether the colorimetric region selected by the selection unit 101*b* is actually used for the image stabilization control. As illustrated in FIG. 7, in the area 503, check boxes corresponding to candidates of the respective colorimetric region, selected by the selection unit 101*b*, are displayed. The user can operate the check boxes using a mouse, for example, to input an instruction indicating whether the corresponding colorimetric regions are to be actually used for the image stabilization control. Then, the input/output control unit 101*c* repeats the processing from S102. Thus, the user can input another target color. When the designation information is not input in S103, the input/output control unit 101*c* repeats the processing from S102. When the confirm button 504 is clicked in S102, the input/output control unit 101*c* ends the processing in FIG. 6.

Thereafter, when the user inputs the execution of printing to the input/output control unit 101*c* using the input/output unit 101, the input/output control unit 101*c* transmits, via the communication unit 101*f*, a print job including the colorimetric region information indicating the colorimetric region selected to be used, to the image forming apparatus 100.

In the present embodiment described above, for the target color designated by the user, the host computer 101 presents, to the user, a region that is less likely to be affected by the reflection as the colorimetric region. With this configuration, an appropriate image forming condition can be set with deterioration of the colorimetric accuracy suppressed. Note that while the user selects the target color on the image 501 in the present embodiment, a mode may be employed in which the color value of the target color is input with a numerical value. Furthermore, a configuration may be employed in which the user can set the maximum tolerable color difference ΔE used for the selection criterion, through user input. With a larger maximum tolerable color difference ΔE, a larger number of colorimetric regions can be selected. On the other hand, with a smaller maximum tolerable color difference ΔE, the number of selectable colorimetric regions can be narrowed down.

Second Embodiment

Next, a second embodiment will be explained mainly on differences from the first embodiment. In the first embodiment, the user inputs the designation information for designating the target color. In the present embodiment, the host computer 101 selects colorimetric regions that satisfy the selection criterion based on the image data, and the user selects the colorimetric region of the target color from the selected colorimetric regions.

Figure 8:
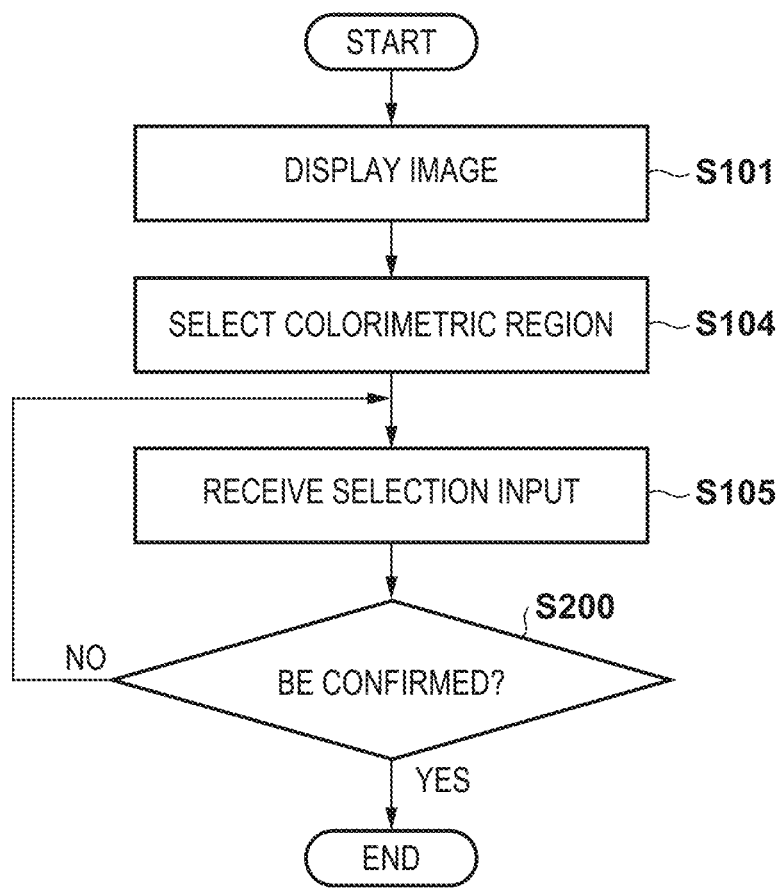
FIG. 8 is a flowchart of colorimetric region setting processing according to an embodiment.
Figure 9:
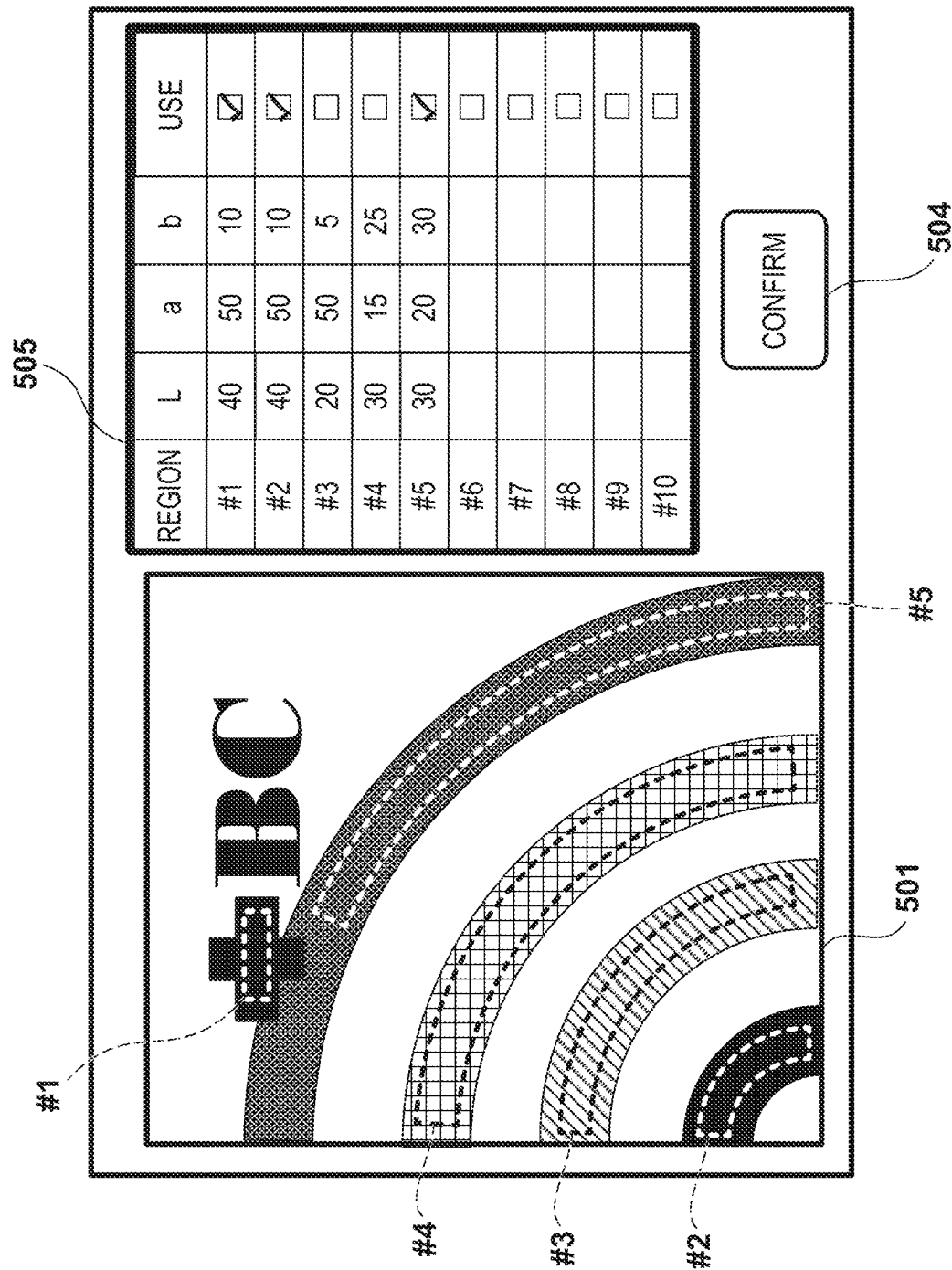
FIG. 9 is a diagram illustrating an example of a screen displayed to a user in colorimetric region setting processing.

FIG. 8 is a flowchart of colorimetric region setting processing according to the present embodiment. Note that in the flowchart in FIG. 8, the processing steps that are similar to those in the first embodiment illustrated in FIG. 6 are denoted with the same step numbers. In S101, the input/output control unit 101c displays an image formed based on the image data included in the print job, on a display of the input/output unit 101d. FIG. 9 is an example of a screen displayed on the display of the input/output unit 101d. As illustrated in FIG. 9, the image 501 formed based on the image data is displayed on the display.

The selection unit 101b selects the colorimetric region from the image 501 based on the selection criterion in S104. In the first embodiment, the selection unit 101b selects the colorimetric region corresponding to the target color. Meanwhile, in the present embodiment, the color is not limited, and the selection unit 101b selects regions of one or more colors satisfying the selection criterion, as the colorimetric regions. Thus, colorimetric regions of various colors may be selected, with the maximum value of the color difference between pixels in the colorimetric region selected in S104 being equal to or smaller than the maximum tolerable color difference ΔE. The input/output control unit 101c displays, as a candidate of the colorimetric region, the colorimetric region selected by the selection unit 101b, in an area 505 in FIG. 9. It is illustrated in the area 505 in FIG. 9 that the selection unit 101b has selected five colorimetric regions #1 to #5. The colorimetric region selected by the selection unit 101b is displayed, by the input/output control unit 101c, in an overlapping manner on the image 501. The color information determination unit 101a determines the color value of each colorimetric region selected by the selection unit 101b based on the image data. The input/output control unit 101c displays the color value determined by the color information determination unit 101a, in the area 505 in FIG. 9.

When the pixels in the colorimetric region have the same color value, this color value is displayed as the color value of the colorimetric region in the area 505. On the other hand, when the pixels in the colorimetric region have different color values, a representative color value is displayed as the color value of the colorimetric region in the area 505. The representative color value is, for example, the color value corresponding to the largest number of pixels in the colorimetric region. Alternatively, the representative color value is, for example, an average value of the color values of the respective pixels in the colorimetric region. Although not illustrated in FIG. 9, a configuration may be employed in which a color corresponding to the color value displayed in the area 505 is displayed in the area 505.

Then, in S105, the input/output control unit 101c receives the selection input indicating whether the colorimetric region selected by the selection unit 101b is actually used for the image stabilization control. As illustrated in FIG. 9, in the area 505, check boxes corresponding to candidates of the respective colorimetric region, selected by the selection unit 101b, are displayed. The user can operate the check box corresponding to the colorimetric region of the target color using a mouse, for example, to input an instruction indicating whether the colorimetric region of the target color is to be actually used for the image stabilization control.

In S200, the input/output control unit 101c determines whether a confirm button 504 in FIG. 9 is clicked with a mouse. When the confirm button 504 is not clicked with the mouse, the input/output control unit 101c repeats the processing from S105. On the other hand, when the confirm button 504 is clicked in S200, the input/output control unit 101c ends the processing in FIG. 8. Thereafter, when the user inputs the execution of printing to the input/output control unit 101c using the input/output unit 101, the input/output control unit 101c transmits, via the communication unit 101f, a print job including the colorimetric region information indicating the colorimetric region selected to be used, to the image forming apparatus 100.

In the present embodiment described above, the host computer 101 presents to the user, regions that are less likely to be affected by the reflection as the colorimetric regions, and the user selects the target color from the colorimetric regions presented. With this configuration, an appropriate image forming condition can be set with deterioration of the colorimetric accuracy suppressed. Unlike in the first embodiment, the user is not required to input the designation information, whereby the user operation can be reduced.

Note that the first embodiment and the second embodiment can be combined. Specifically, as described in the second embodiment, the host computer 101 presents, to the user, regions that are less likely to be affected by the reflection as the colorimetric regions. When the target color is included in the presented colorimetric regions, the user selects the colorimetric region to be used from the presented colorimetric regions. On the other hand, a configuration may be employed in which when the target color is not included in the presented colorimetric regions, the user can designate the color value of the target color as in the first embodiment. For example, with the configuration of the second embodiment, the colorimetric region with the target color desired by the user may fail to be presented, when the number of colorimetric regions selected by the selection unit 101b is limited. In such a case, a configuration may be employed in which the user designates the color value of the target color as in the first embodiment.

Furthermore, a configuration may be employed in which when the user designates the color value of the target color due to the target color desired by the user not being included in the colorimetric regions selected by the selection unit 101b, the selection criterion for the colorimetric region is relaxed from that before the user designates the color value of the target color. For example, the maximum tolerable color difference ΔE used for the condition related to the color value can be increased, in response to the user designating the color value of the target color. Alternatively, at least one of the first predetermined number to the third predetermined number used for the first condition to the third condition related to the number of sequential pixels may be reduced, in response to the user designating the color value of the target color.

Third Embodiment

Figure 10:
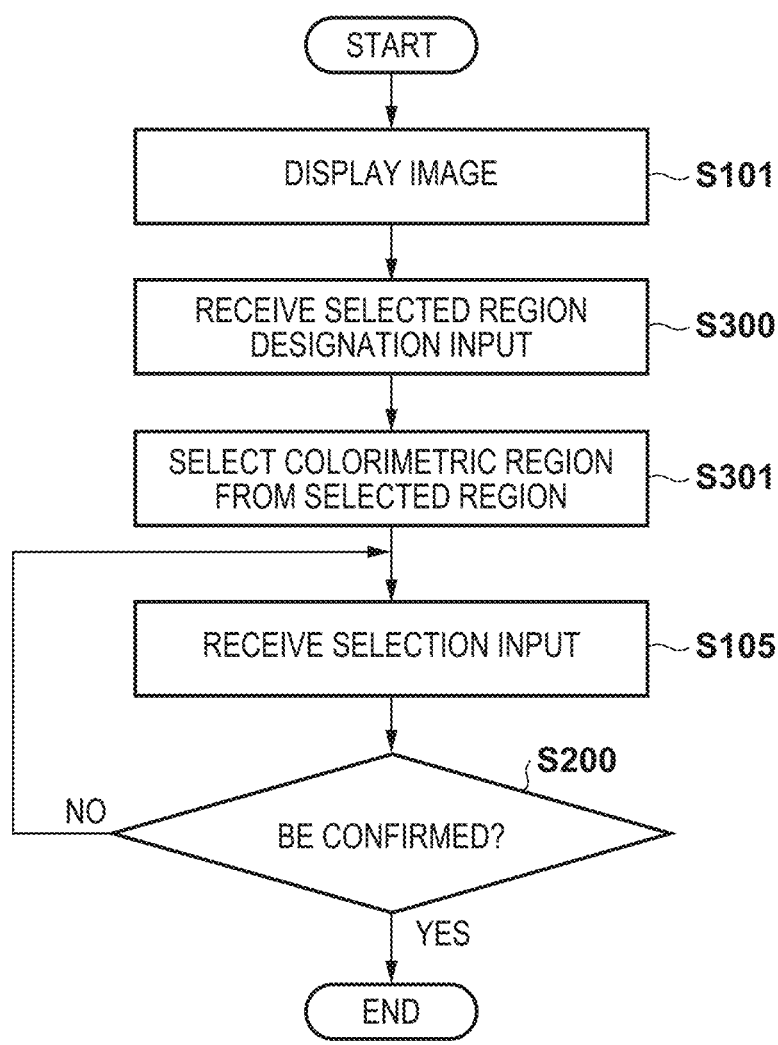
FIG. 10 is a flowchart of colorimetric region setting processing according to an embodiment.

Next, a third embodiment will be explained mainly on differences from the second embodiment. FIG. 10 is a flowchart of colorimetric region setting processing according to the present embodiment. Note that, the processing steps similar to those in the flowchart of the setting processing in the second embodiment in FIG. 8 are denoted with the same step numbers and descriptions thereof will be omitted.

Figure 11:
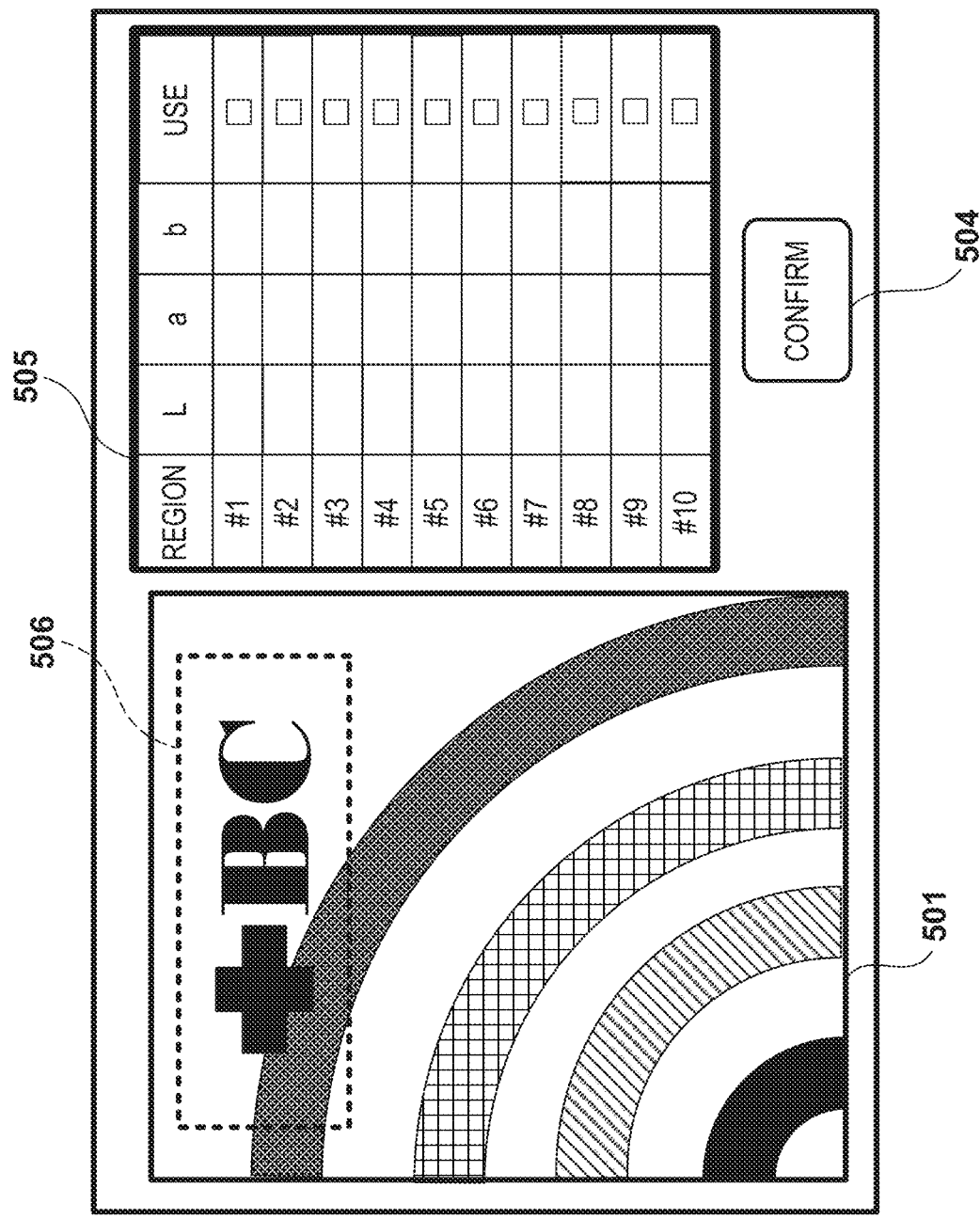
FIG. 11 is a diagram illustrating an example of a screen displayed to a user in colorimetric region setting processing.

After the image 501 formed based on the image data is displayed in S101, the user input made by the user for designating the selected region is received in S300. The user designates the selected region by designating a region on the image 501, with a mouse. FIG. 11 illustrates a state in which the user has selected a region 506 as the selected region in S300. In this case, the selection unit 101b selects candidates of the colorimetric region in the selected region 506 in S301.

As described above, the selection unit 101b selects the colorimetric region in the selected region 506 designated by the user. With a region for selecting the colorimetric region limited within the selected region, the number of colorimetric regions selected by the selection unit 101b can be narrowed down. With the user designating a region including the target color as the selected region, the target color is likely to be included in the colorimetric regions selected by the selection unit 101b. Thus, with a region less likely to be affected by the reflection being selected as the colorimetric region, an appropriate image forming condition can be set with deterioration of the colorimetric accuracy suppressed.

Fourth Embodiment

The input/output control unit 101c according to the first to the third embodiments is configured to control the image forming condition based on the result of measuring the color value (detected color information) of the colorimetric region and the data value (color information) of the colorimetric region indicated by the image data. Alternatively, the input/output control unit 101c may be configured to determine whether the color difference between the result of measuring the color value of the colorimetric region acquired from the reading apparatus 160 and a reference color set in advance falls within a tolerable range for example.

The input/output control unit 101c functions as an inspection unit that performs inspection on the tint of the colorimetric region selected by the user. Here, a configuration is employed in which the tolerable range of the color difference can be input by the user. In the following, a print product, output from the image forming apparatus 100, with the color difference between the result of measuring the color value of the colorimetric region and the reference color falling within the tolerable range is referred to as a non-defective product, whereas a print product with the color difference falling outside the tolerable range is referred to as a defective product.

The input/output control unit 101c outputs, to the input/output unit 101d, inspection result information indicating which of the pages of the print products, output from the image forming apparatus 100 based on the print job, is the defective product. The inspection result information may be information indicating which of the pages of the print products, output from the image forming apparatus 100 based on the print job, is the non-defective product.

The CPU 114 of the image forming apparatus 100 may be configured to acquire a result of determining the non-defective product and the defective product (inspection result) from the input/output control unit 101c, and control the conveyance of the sheet in such a manner that the non-defective product and the defective product, conveyed on the conveyance path in the image forming apparatus 100, are discharged onto different trays of the finisher 190.

Miscellaneous

Note that the functions of the host computer 101 described above can be incorporated into the image forming apparatus 100. Specifically, the CPU 114 of the image forming apparatus 100 displays the image, formed based on the image data stored in the HDD 115, on the operation panel 120. The user can operate the operation panel 120 to set the colorimetric region.

The input/output control unit 101c that is configured to acquire the result of measuring the color value of the colorimetric region (inspected color information) in the above description, may be configured to acquire the read data. In this case, the input/output control unit 101c determines the inspected color information indicating the result of measuring the color value of the colorimetric region, based on colorimetric region information indicating the colorimetric region from the read data acquired from the reading apparatus 160.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-067244, filed Apr. 12, 2021, which is hereby incorporated by reference herein in its entirety.

What is claimed is:

1. An information processing apparatus comprising:
a selection unit configured to select, based on a selection criterion, one or more first colorimetric regions in an image to be formed based on image data;
an input/output control unit configured to receive a first user input for selecting one or more second colorimetric regions from the one or more first colorimetric regions selected by the selection unit; and
a transmission unit configured to transmit a print job including information indicating the one or more second colorimetric regions and the image data, to an image forming apparatus, wherein
the input/output control unit is further configured to receive a second user input for designating a selected region in the image to be formed based on the image data, and
the selection unit is further configured to select, when the selected region is designated by the second user input, the one or more first colorimetric regions in the selected region.

2. The information processing apparatus according to claim 1, wherein
the input/output control unit receives a third user input for designating a target color, and
the selection unit is further configured to select, when the target color is designated by the third user input, the one or more first colorimetric regions from regions corresponding to the target color in the image to be formed based on the image data.

3. The information processing apparatus according to claim 2, wherein
the input/output control unit is further configured to display the image to be formed based on the image data on a display unit,
the third user input is an input for designating a region in the image displayed on the display unit, and
the input/output control unit is further configured to determine, when the third user input is input, a color value of the region, in the image, designated by the third user input, and display the determined color value on the display unit as a color value of the target color.

4. The information processing apparatus according to claim 3, wherein the input/output control unit is further configured to count, for each color value, number of pixels of a plurality of pixels in the region of the image designated by the third user input, and display on the display unit a color value corresponding to largest number of the pixels, as the color value of the target color.

5. The information processing apparatus according to claim 3, wherein the input/output control unit is further configured to count, for each color value, number of pixels of a plurality of pixels in the region of the image designated by the third user input, and display on the display unit a color value having a ratio of number of pixels exceeding a threshold, as the color value of the target color.

6. The information processing apparatus according to claim 5, wherein the input/output control unit is further configured to display, on the display unit, a screen prompting a re-input of the third user input, when there is no color value having a ratio of number of pixels exceeding the threshold.

7. The information processing apparatus according to claim 1, wherein the input/output control unit is further configured to display a color value of the one or more first colorimetric regions selected by the selection unit, on the display unit.

8. The information processing apparatus according to claim 1, wherein the selection criterion includes a first condition under which the one or more first colorimetric regions are selected from regions with a maximum value of a color difference being equal to or smaller than a predetermined value, in the image to be formed based on the image data.

9. The information processing apparatus according to claim 8, wherein the selection criterion includes a second condition under which the one or more first colorimetric regions are selected from regions, of regions satisfying the first condition, in which a number of sequential pixels in a first direction is larger than a predetermined number.

10. The information processing apparatus according to claim 9, wherein the first direction is a direction orthogonal to a conveyance direction of a sheet when the image is formed on the sheet by the image forming apparatus based on the image data.

11. The information processing apparatus according to claim 8, wherein the input/output control unit is further configured to receive a fourth user input for setting the predetermined value.

12. A non-transitory computer readable storage medium storing a program, the program including an instruction causing, when executed by one or more processors of a computer including the one or more processors, the computer to:
select, based on a selection criterion, one or more first colorimetric regions in an image to be formed based on image data;
receive a first user input for selecting one or more second colorimetric regions from the one or more first colorimetric regions being selected; and
transmit a print job including information indicating the one or more second colorimetric regions and the image data, to an image forming apparatus, wherein
a second user input is received for designating a selected region in the image to be formed based on the image data, and
when the selected region is designated by the second user input, there is a selection of the one or more first colorimetric regions in the selected region.

13. An image forming system comprising:
an information processing apparatus; and
an image forming apparatus,
wherein the information processing apparatus includes:
a selection unit configured to select, based on a selection criterion, one or more first colorimetric regions in an image to be formed based on image data,
an input/output control unit configured to receive a first user input for selecting one or more second colorimetric regions from the one or more first colorimetric regions selected by the selection unit, and
a transmission unit configured to transmit a print job including information indicating the one or more second colorimetric regions and the image data, to the image forming apparatus, wherein
the input/output control unit is further configured to receive a second user input for designating a selected region in the image to be formed based on the image data, and the selection unit is further configured to select, when the selected region is designated by the second user input, the one or more first colorimetric regions in the selected region, wherein the image forming apparatus includes:

an image forming unit configured to form the image on a sheet based on the image data included in the print job, a colorimetric unit configured to measure a color value of the one or more second colorimetric regions in the image formed on the sheet, and a control unit configured to control an image forming condition, based on a result of measuring the color value of each of the one or more second colorimetric regions by the colorimetric unit and a data value, indicated by the image data, corresponding to each of the one or more second colorimetric regions.

* * * * *